United States Patent
Varadanarayanan et al.

(10) Patent No.: US 11,063,854 B2
(45) Date of Patent: Jul. 13, 2021

(54) SYSTEM AND METHOD FOR ESTIMATING HIGH SPEED DOPPLER IN LTE USING SUB-SAMPLING AND ERROR INDICATORS

(71) Applicant: Signalchip Innovations Private Limited, Bangalore (IN)

(72) Inventors: Mugundhan Varadanarayanan, Bangalore (IN); Himamshu Gopalakrishna Khasnis, Bangalore (IN)

(73) Assignee: SIGNALCHIP INNOVATIONS PRIVATE LIMITED, Bangalore (IN)

( * ) Notice: Subject to any disclaimer, the term of this patent is extended or adjusted under 35 U.S.C. 154(b) by 0 days.

(21) Appl. No.: 15/969,313

(22) Filed: May 2, 2018

(65) Prior Publication Data

US 2019/0132225 A1 May 2, 2019

(30) Foreign Application Priority Data

May 2, 2017  (IN) .............................. 201741015548

(51) Int. Cl.
*H04L 12/26* (2006.01)
*H04L 1/00* (2006.01)

(52) U.S. Cl.
CPC ............ *H04L 43/08* (2013.01); *H04L 1/0061* (2013.01); *H04L 43/0823* (2013.01); *H04L 43/16* (2013.01)

(58) Field of Classification Search
None
See application file for complete search history.

(56) References Cited

U.S. PATENT DOCUMENTS

| | | | |
|---|---|---|---|
| 2005/0156781 A1* | 7/2005 | Coleman | G01S 7/282 342/174 |
| 2011/0142115 A1* | 6/2011 | Wang | G01S 11/06 375/227 |
| 2013/0044721 A1* | 2/2013 | Yang | H04L 5/0053 370/329 |
| 2014/0348436 A1* | 11/2014 | Yang | H04N 19/61 382/233 |
| 2017/0373745 A1* | 12/2017 | Park | H04B 7/0456 |
| 2019/0044686 A1* | 2/2019 | Sakamoto | H04L 5/0051 |

\* cited by examiner

*Primary Examiner* — Gregory B Sefcheck
*Assistant Examiner* — Majid Esmaeilian

(57) ABSTRACT

Disclosed herein is a system and a method for estimating frequency offset of LTE using DMRS and CRC. The system includes one or more modules as follows. A digital filtering and FFT unit 106 performs FFT operation on a base band signal. An individual user data extraction unit 108 extracts user data individual. A frequency correction unit 110 processes the extracted user data if individual. A DEMAP into PUSCH and DMRS unit 112 splits a corrected frequency signal. An equalizer unit 114 performs channel equalization. The channel estimation unit 116 determines a channel estimation (H). A multiplexer unit 122 receives the estimated frequency. An equalized data processing and CRC calculating unit 124 receives and processed the equalized data. A CRC value checking unit 126 determines whether a calculated cyclic redundancy check (CRC) value is valid or invalid.

9 Claims, 4 Drawing Sheets

SYSTEM AND METHOD FOR ESTIMATING HIGH SPEED DOPPLER IN LTE USING SUB-SAMPLING AND ERROR INDICATORS

CROSS-REFERENCE TO RELATED APPLICATIONS

This application claims priority to Indian patent application no. 201741015548 filed on May 2, 2017, the complete disclosure of which, in its entirely, is herein incorporated by reference.

BACKGROUND

Technical Field

The embodiments herein generally relate to estimating a high speed doppler, and, more particularly, to a method and system for estimating high speed doppler in long term evolution (LTE) using sub-sampling and error indicators.

Description of the Related Art

In the recent days, a user requirement for mobile communications systems is increasing. At the same time, the development of LTE mobile communication system has gradually getting attention of the mobile communications industry.

The user data reaches the base station after getting reflected through multiple obstacles like buildings, vehicles etc., and the user mobile device might be moving in a vehicle or train. This movement causes the actual received frequency to be slightly offset from the actual transmitted frequency.

The LTE system has many advantages but relatively sensitive to frequency offset, even if a small deviation may also cause orthogonality between subcarriers OFDM system is destroyed, so that the communication quality may suffer a greater impact, leading to a significant decline in system performance. The existing technology is unable to estimate the frequency offset for high-speed scene, therefore, how fast, accurate frequency offset estimate become a key impact on system performance in high-speed scenes. The existing technology is unable to estimate the frequency offset when frequency range exceeds (greater than 1000 Hz or smaller than −1000 Hz).

Accordingly, there remains a need for a system and a method to estimate high speed doppler in LTE using sub-sampling and error indicators.

SUMMARY

In view of a foregoing, an embodiment herein provides a system for estimating high speed doppler in Long Term Evolution (LTE) using sub-sampling and error indicators. The system includes an antenna, an analog front end/analog to digital convertor unit, a digital filtering and Fast Fourier Transform (FFT) unit, an individual user data extraction unit, a frequency correction unit, a demapper (DEMAP) into PUSCH and DMRS unit, an equalizer unit, a channel estimation unit, a frequency estimation unit, a multiplexer, an equalized data processing and CRC calculating unit, a CRC value checking unit, and an alias calculation unit.

The digital filtering and Fast Fourier Transform (FFT) unit performs FFT operation on a base band signal. The base band signal includes one or more user data. The individual user data extraction unit extracts user data of an individual from the one or more user data. The user data of the individual includes (i) a Demodulation Reference Signal (DMRS), and (ii) a Physical Uplink Shared (PUSCH) signal. The frequency correction unit processes the extracted user data of the individual to obtain a corrected frequency signal. The demapper (DEMAP) into PUSCH and DMRS unit (i) receives the corrected frequency signal and splits the corrected frequency signal into (a) the DMRS signal and (b) the PUSCH signal and (ii) transmits the DMRS signal and the PUSCH signal. The equalizer unit receives the PUSCH signal from the DEMAP into PUSCH and DMRS unit and performs channel equalization on the PUSCH signal to obtain equalized data. The channel estimation unit receives the DMRS signal. The channel estimation unit determines a channel estimation (H) in the form of a complex value for each sub carrier. The channel estimation unit receives the DMRS signal for every 0.5 micro seconds. The DMRS signal is spread over multiple sub carriers in a frequency domain.

The channel estimation unit provides difference in angles between the channel estimation of time slots 0 and 1. The frequency estimation unit determines an estimate of a frequency offset based on the difference of angle of channel estimates of two slots within one sub frame after appropriate scaling and transmits the estimated frequency. The multiplexer receives the estimated frequency and transmits the estimated frequency to the frequency correction unit. The equalized data processing and CRC calculating unit (i) receives the equalized data associated with the PUSCH signal from the equalizer unit, and (ii) processes the equalized data to calculate cyclic redundancy check (CRC) value.

The CRC value checking unit determines whether the calculated cyclic redundancy check (CRC) value is valid (=1) or invalid (=0). When the CRC is valid, the estimated frequency is same as actual frequency offset. When the CRC value is 0 (invalid CRC), a number of invalid CRCs is calculated. The alias calculation unit calculates an alias frequency corresponding to the estimated frequency when the number of invalid CRC exceeds a threshold value and transmits the alias frequency to the multiplexer for further processing to determine whether a calculated cyclic redundancy check (CRC) value associated with the alias frequency is valid or invalid.

In an embodiment, the antenna receives a radio frequency signal from one or more user devices.

In another embodiment, the analog front end/analog to digital convertor unit (i) processes the radio frequency signal (ii) converts the radio frequency signal into the base band signal.

In yet another embodiment, the estimated frequency is equal to an alias of the actual frequency when an actual frequency offset is greater than 1000 Hz or smaller than −1000 HZ. The actual frequency estimate is −700 Hz or 1300 Hz when the DMRS frequency estimate is −700 Hz.

In yet another embodiment, the frequency estimation unit provides a frequency of the channel estimation ranges between −1000 Hz and 1000 Hz.

In yet another embodiment, the complex value comprises a magnitude and an angle that are (i) (angle($\Sigma_{k=0}^{N-1}$ ▓ ), and (ii) angle($\Sigma_{k=0}^{N-1}$ ▓ ). The angle difference between channel estimates of two DMRS signals within a sub frame provides the actual frequency offset $$\hat{f}_{\text{off}} = \frac{\text{angle}\left(\sum_{k=0}^{N-1} \widetilde{h}_{k,0}\right) - \text{angle}\left(\sum_{k=0}^{N-1} \widetilde{h}_{k,1}\right)}{2\pi} 2000.$$

The $f_{\text{off}}$ is an estimated frequency offset.

In one aspect, a method of estimating high speed doppler in Long Term Evolution (LTE) using sub-sampling and error indicators is provided. The method includes the following steps: (a) receiving, using an antenna, a radio frequency signal from one or more user devices; (b) converting, using an analog front end/analog to digital convertor, the radio frequency signal into a base band signal; (c) performing, using a digital filtering and FFT unit, FFT operation on the base band signal, wherein the base band signal includes one or more of user data; (d) extracting, using an individual user data extraction unit, user data of an individual from the one or more user data; (e) processing, using a frequency correction unit, the extracted user data of the individual to obtain a corrected frequency signal; (f) receiving, using a demapper (DEMAP) into PUSCH and DMRS unit, the corrected frequency signal; (g) splitting, using the DEMAP into PUSCH and DMRS unit, the corrected frequency signal into a DMRS signal and a PUSCH signal; (h) transmitting, using the DEMAP into PUSCH and DMRS unit, the DMRS signal and the PUSCH signal; (i) receiving, using an equalizer unit, the PUSCH signal from the DEMAP into PUSCH and DMRS unit; (j) performing, using the equalizer unit, channel equalization on the PUSCH signal to obtain equalized data; (k) receiving, using a channel estimation unit, the DMRS signal; (l) determining, using the channel estimation unit, a channel estimation (h) in the form of a complex value for each sub carrier; (m) providing, using the channel estimation unit, difference in angles between the channel estimation of time slots 0 and 1; (n) determining, using a frequency estimation unit, an estimate of a frequency offset based on the difference of angle of channel estimates of two slots within one sub frame after appropriate scaling; (o) transmitting, using the frequency estimation unit, the estimated frequency; (p) receiving, using a multiplexer unit, the estimated frequency; (q) transmitting, using the multiplexer unit, the estimated frequency to the frequency correction unit; (r) receiving, using an equalized data processing and CRC calculating unit, the equalized data associated with the PUSCH signal from the equalizer unit; (s) processing, using the equalized data processing and CRC calculating unit (124), the equalized data to calculate cyclic redundancy check (CRC) value; and (t) determining, using a CRC value unit, whether the calculated cyclic redundancy check (CRC) value is valid (=1) or invalid (=0), wherein when the CRC is valid, the estimated frequency is same as actual frequency offset, wherein when the CRC value is 0 (invalid CRC), a number of invalid CRCs is calculated.

In one embodiment, the method further includes the following steps: (i) calculating an alias frequency corresponding to the estimated frequency when the number of invalid CRC exceeds a threshold value using an alias calculation unit, and (ii) transmitting the alias frequency to the multiplexer (122) for further processing to determine whether a calculated cyclic redundancy check (CRC) value associated with the alias frequency is valid or invalid.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
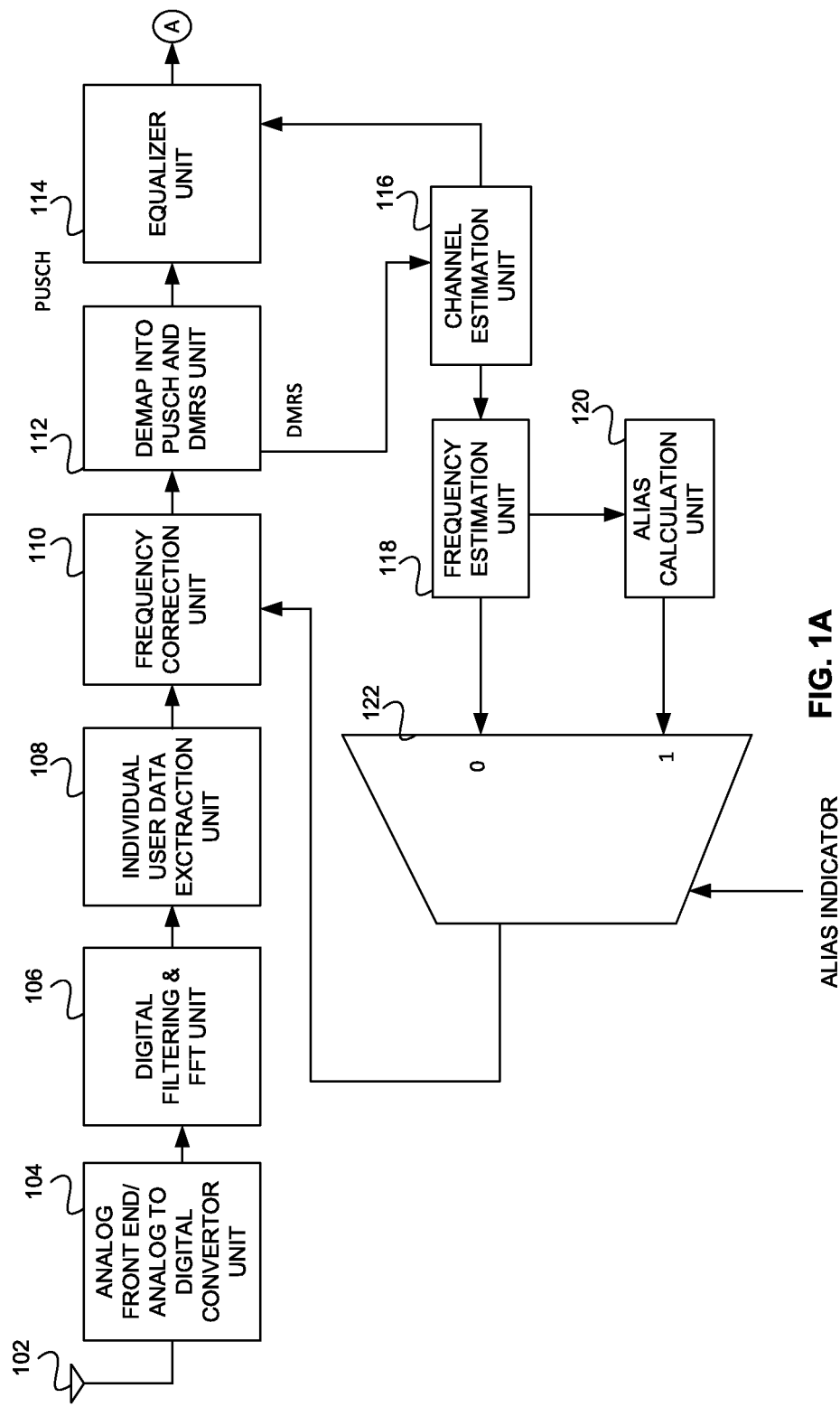
FIGS. 1A-1B are block diagrams of a system for estimating high speed doppler in Long Term Evolution (LTE) according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Various embodiments provide methods and systems to estimate a high speed doppler in LTE. As mentioned, there remains a need for a method and a system which estimates high speed doppler in LTE using sub-sampling and error indicators. Referring now to the drawings, and more particularly to FIGS. 1A through 2B, where similar reference characters denote corresponding features consistently throughout the figures, there are shown preferred embodiments.

Figure 1B:
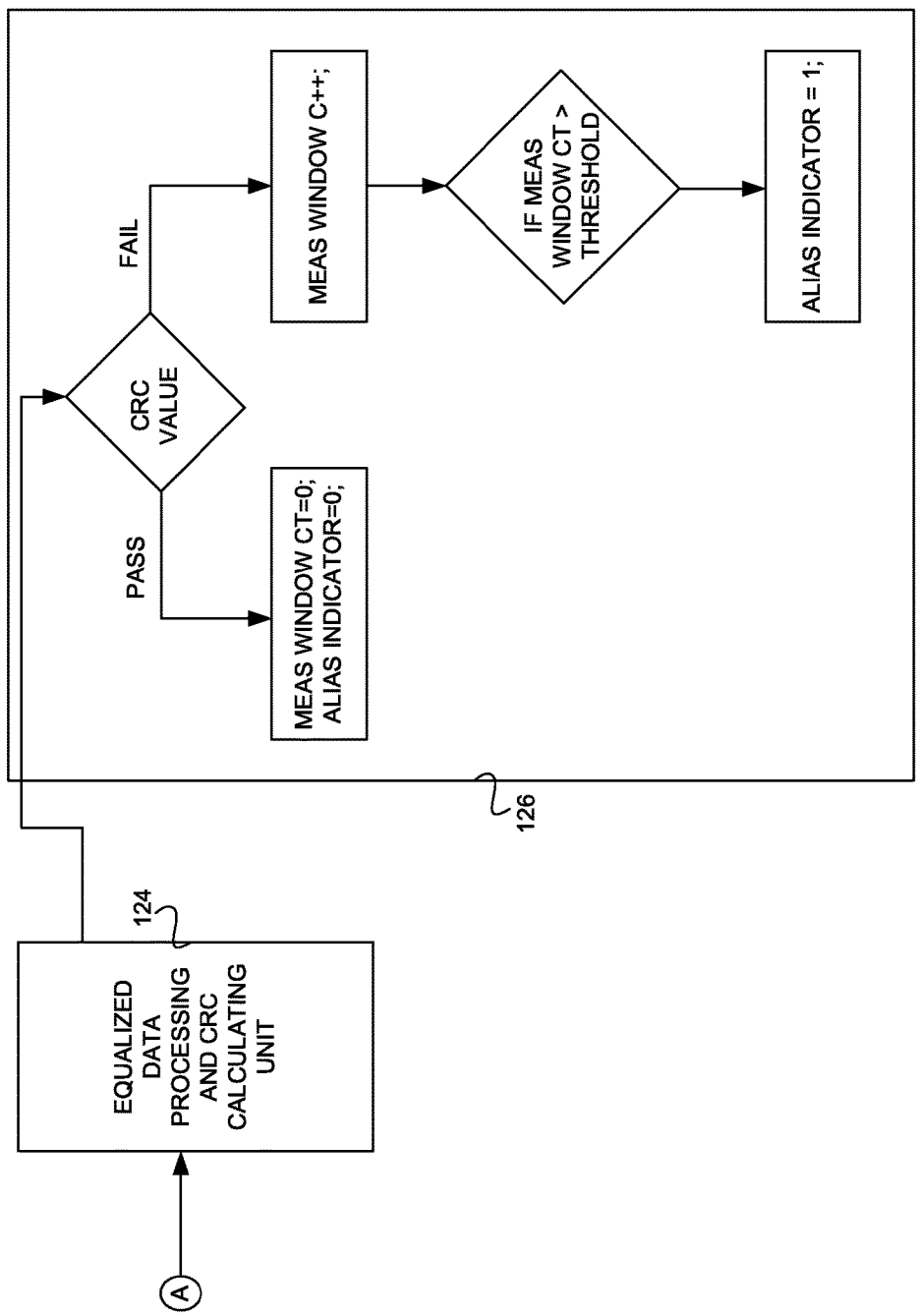

FIGS. 1A-1B are block diagrams of a system for estimating high speed doppler in Long Term Evolution (LTE) according to an embodiment herein. The system includes an antenna 102, an analog front end/analog to digital convertor unit 104, a digital filtering and Fast Fourier Transform (FFT) unit 106, an individual user data extraction unit 108, a frequency correction unit 110, a demapper (DEMAP) into Physical Uplink Shared (PUSCH) signal and Demodulation Reference Signal (DMRS) unit 112, an equalizer unit 114, a channel estimation unit 116, a frequency estimation unit 118, an alias calculation unit 120, a multiplexer unit 122, an equalized data processing and CRC calculating unit 124 and a CRC value checking unit 126.

The antenna 102 receives a radio frequency signal from one or more user devices. The analog front end/analog to digital convertor unit 104 processing the radio frequency signal. The radio frequency signal is converted to a base band signal using the analog front end/analog to digital convertor unit 104.

The digital filtering and FFT unit 106 performs FFT operation on the base band signal. The base band signal includes one or more user data. The individual user data extraction unit 108 extracts user data of an individual from the one or more user data. The user data of the individual includes (i) a DMRS signal, and (ii) a PUSCH signal. The frequency correction unit 110 processes the extracted user data of the individual to obtain a corrected frequency signal.

The DEMAP into PUSCH and DMRS unit 112 (i) receives the corrected frequency signal and splits the corrected frequency signal into (a) the DMRS signal and (b) the PUSCH signal and (ii) transmits the DMRS signal and the PUSCH signal. The individual user data includes a reference signal (also called as DMRS) and a voice/data information of a user. The voice/data information is also called as the PUSCH. The equalizer unit 114 receives the PUSCH signal from the DEMAP into PUSCH and DMRS unit 112 and performs channel equalization on the PUSCH signal to obtain equalized data.

The channel estimation unit 116 receives the DMRS signal. The channel estimation unit 116 determines a channel estimation (H) in the form of a complex value for each sub carrier. The channel estimation unit 116 receives the DMRS signal for every 0.5 micro seconds. The DMRS signal is spread over multiple sub carriers in a frequency domain. The channel estimation unit 116 provides difference in angles between the channel estimation of time slots 0 and 1. The frequency estimation unit 118 determines an estimate of a frequency offset based on the difference of angle of channel estimates of two slots within one sub frame after appropriate scaling. Every two DMRS signals are part of sub frame. The channel estimation being complex number has magnitude and angle information, that are (i) (angle($\Sigma_{k=0}^{N-1} \tilde{h}_{k,1}$), and (ii) angle($\Sigma_{k=0}^{N-1} \tilde{h}_{k,8}$). The angle difference between two channel estimates of two DMRS signals within a sub frame provides an actual frequency offset.

$$\hat{f}_{off} = \frac{\text{angle}\left(\sum_{k=0}^{N-1} \tilde{h}_{k,1}\right) - \text{angle}\left(\sum_{k=0}^{N-1} \tilde{h}_{k,8}\right)}{2\pi} 2000$$

where $f_{off}$ is the estimated frequency offset

The DMRS signals always estimate the frequency between (−1000, 1000) Hz. For example, the actual frequency offset is greater than 1000 Hz or smaller than −1000 Hz. According to sampling theorem, estimated value may be an alias of the actual frequency.

For example, if the actual frequency is 1300 Hz, according sampling theory, estimated frequency will be −1000+300=−700 Hz. Here lies the main problem, If the DMRS frequency estimate says −700 Hz, the actual frequency estimate can be −700 Hz or 1300 Hz, based on this limitation, DMRS based frequency estimate will always return a value between (−1000, 1000) Hz. The frequency estimation unit 118 transmits the estimated frequency. The multiplexer unit 122 (i) receives the estimated frequency, and (ii) transmits the estimated frequency to the frequency correction unit 110.

The equalized data processing and CRC calculating unit 124 (i) receives the equalized data associated with the PUSCH signal from the equalizer unit 114, and (ii) processes the equalized data to calculate cyclic redundancy check (CRC) value. The CRC value checking unit 126 determines whether the calculated cyclic redundancy check (CRC) value is valid (=1) or invalid (=0). When the CRC is valid, it can be taken as that the estimated frequency is same as actual frequency offset. When the CRC value is 0 (invalid CRC), a number of invalid CRCs is calculated.

The alias calculation unit 120 calculates an alias frequency corresponding to the estimated frequency when a number of invalid CRC exceeds a threshold value and transmits the alias frequency to the multiplexer (122) for further processing to determine whether a calculated cyclic redundancy check (CRC) value associated with the alias frequency is valid or invalid.

In one embodiment, if the CRC values are valid (=1), that is an indication that estimated frequency offset is the actual frequency offset. If the CRCs are invalid (=0), then the number of such invalid CRCs is counted within a predetermined interval. If the number of invalid CRC exceeds a threshold value, that is an indication that estimated frequency value is (alias indicator 1) actually the alias of the actual frequency offset, and the real frequency offset is estimated as 2000+ estimated value if estimated frequency value is negative or −2000+ estimated value if estimated frequency value is positive.

Figure 2A:
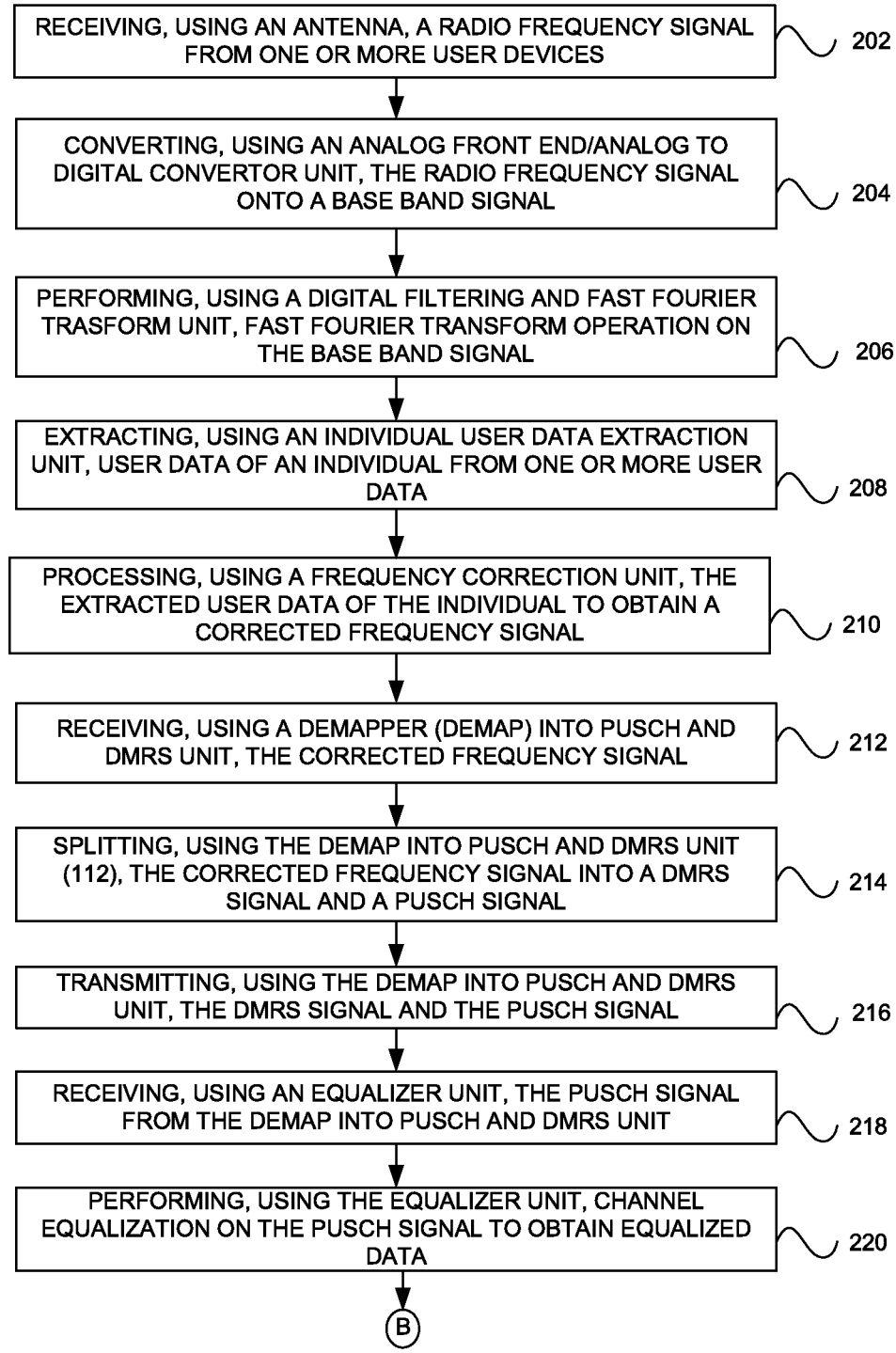
FIGS. 2A-2B are flow diagrams illustrating a method of estimating the high speed doppler in the LTE according to an embodiment herein.
Figure 2B:
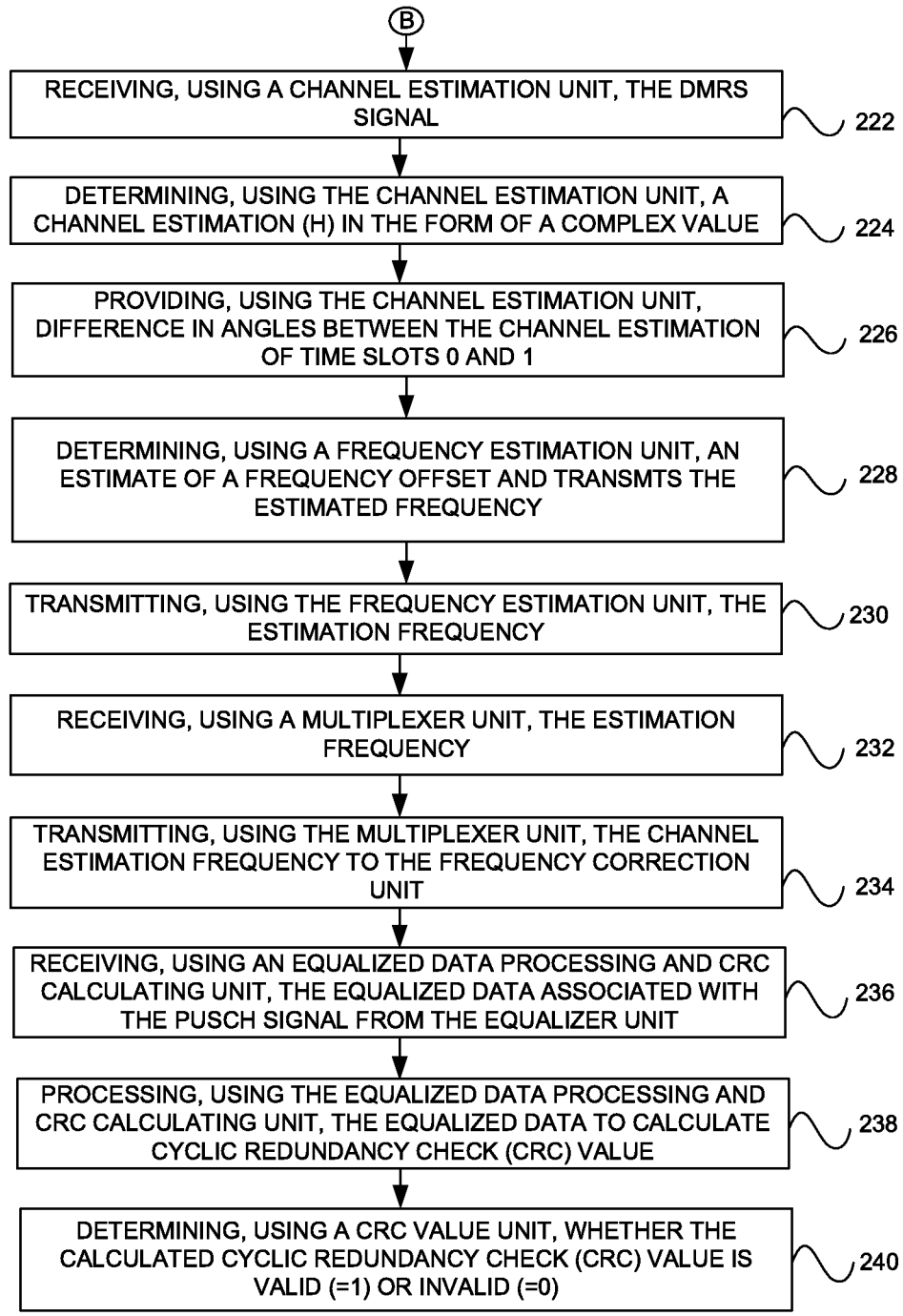

FIGS. 2A-2B are flow diagrams illustrating a method of estimating the high speed doppler in LTE according to an embodiment herein.

At step 202, a radio frequency signal is received from one or more user devices using the antenna 102. At step 204, the radio frequency signal is converted to a base band signal using the analog front end/analog to digital convertor 104. At step 206, FFT operation is performed on the base band signal using the digital filtering and FFT unit 106. The base band signal includes one or more user data. At step 208, the user data of an individual is extracted from the one or more user data using the individual user data extraction unit 108. At step 210, the extracted user data of the individual is processed to obtain a corrected frequency signal using the frequency correction unit 110. At step 212, the corrected frequency signal is received using the DEMAP into PUSCH and DMRS unit (112). At step 214, the corrected frequency signal is split into a DMRS signal and a PUSCH signal using the DEMAP into PUSCH and DMRS unit 112.

At step 216, the DMRS signal and the PUSCH signal are transmitted using the using the DEMAP into PUSCH and DMRS unit (112). At step 218, the PUSCH signal is received from the DEMAP into PUSCH and DMRS unit 112 using the equalizer unit 114. At step 220, channel equalization on the PUSCH signal is performed to obtain equalized data using the equalizer unit 114. At step 222, the DMRS signal is received using the channel estimation unit 116. At step 224, a channel estimation (h) is determined in the form of a complex value for each sub carrier using the channel estimation unit 116. At step 226, difference in angles between the channel estimation of time slots 0 and 1 is provided using the channel estimation unit 116. The frequency estimation unit determines an estimate of a frequency offset based on the difference of angle of channel estimates of two slots within one sub frame after appropriate scaling. At step 230, the estimated frequency is transmitted using the frequency estimation unit 118. At step 232, the estimated frequency is received using the multiplexer unit 122. At step 234, the estimated frequency is transmitted to the frequency correction unit 110 using the multiplexer unit 122. At step 236, the equalized data associated with the PUSCH signal is received from the equalizer unit 114 using the equalized data processing and CRC calculating unit 124. At step 238, the equalized data is processed to calculate cyclic redundancy check (CRC) value using the equalized data processing and CRC calculating unit 124. At step 240, it is determined whether the calculated cyclic redundancy check (CRC)

value is valid (=1) or invalid (=0). When the CRC is valid, it can be taken as the estimated frequency is same as actual frequency offset. When the CRC value is 0 (invalid CRC), a number of invalid CRCs is calculated. In an embodiment, the method includes the step of calculating an alias frequency corresponding to the estimated frequency when the number of invalid CRC exceeds a threshold value using an alias calculation unit (120). In an embodiment, the method includes the step of transmitting the alias frequency to the multiplexer (122) for further processing to determine whether a calculated cyclic redundancy check (CRC) value associated with the alias frequency is valid or invalid.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for estimating high speed doppler in Long Term Evolution (LTE) using sub-sampling and error indicators, comprising:
    a digital filtering and Fast Fourier Transform (FFT) unit that performs FFT operation on a base band signal, wherein the base band signal comprises a plurality of user data;
    an individual user data extraction unit that extracts user data of an individual from the plurality of user data, wherein user data of the individual comprises (i) a Demodulation Reference Signal (DMRS), and (ii) a Physical Uplink Shared (PUSCH) signal;
    a frequency correction unit that processes the extracted user data of the individual to obtain a corrected frequency signal;
    a demapper (DEMAP) into PUSCH and DMRS unit that (i) receives the corrected frequency signal and splits the corrected frequency signal into (a) the DMRS signal and (b) the PUSCH signal and (ii) transmits the DMRS signal and the PUSCH signal;
    an equalizer unit that receives the PUSCH signal from the DEMAP into PUSCH and DMRS unit and performs channel equalization on the PUSCH signal to obtain equalized data;
    a channel estimation unit that receives the DMRS signal, wherein the channel estimation unit determines a channel estimation (H) in the form of a complex value for each sub carrier, wherein the channel estimation unit receives the DMRS signal for every 0.5 micro seconds, wherein the DMRS signal is spread over multiple sub carriers in a frequency domain, wherein the channel estimation unit provides difference in angles between the channel estimates of time slots 0 and 1;
    a frequency estimation unit that determines an estimate of a frequency offset based on the difference of angle of channel estimates of two slots within one sub frame after appropriate scaling and transmits the estimated frequency;
    a multiplexer that receives the estimated frequency, and transmits the estimated frequency to the frequency correction unit;
    an equalized data processing and CRC calculating unit that (i) receives the equalized data associated with the PUSCH signal from the equalizer unit, and (ii) processes the equalized data to calculate cyclic redundancy check (CRC) value;
    a CRC value checking unit that determines whether the calculated cyclic redundancy check (CRC) value is valid or invalid, wherein when the CRC is valid, the estimated frequency is same as actual frequency offset, wherein when the CRC value is 0, a number of invalid CRCs is calculated; and
    an alias calculation unit that calculates an alias frequency corresponding to the estimated frequency when the number of invalid CRC exceeds a threshold value and transmits the alias frequency to the multiplexer for further processing to determine whether a calculated cyclic redundancy check (CRC) value associated with the alias frequency is valid or invalid.

2. The system of claim 1, comprising an antenna that receives a radio frequency signal from a plurality of user devices.

3. The system of claim 1, comprising an analog front end/analog to digital convertor unit that (i) processes the radio frequency signal (ii) converts the radio frequency signal into the base band signal.

4. The system of claim 1, wherein the estimated frequency is equal to an alias of the actual frequency when an actual frequency offset is greater than 1000 Hz or smaller than −1000 HZ, wherein the actual frequency estimate is −700 Hz or 1300 Hz when the DMRS frequency estimate is −700 Hz.

5. The system of claim 1, wherein the frequency estimation unit provides a frequency of the channel estimation that ranges between −1000 Hz and 1000 Hz.

6. The system of claim 1, wherein the complex value comprises a magnitude and an angle, wherein the angle difference between channel estimates of two DMRS signals within a sub frame provides the actual frequency offset.

7. A method of estimating high speed doppler in Long Term Evolution (LTE) using subsampling and error indicators comprising:
    receiving, using an antenna, a radio frequency signal from a plurality of user devices;
    converting, using an analog front end/analog to digital convertor, the radio frequency signal into a base band signal;
    performing, using a digital filtering and FFT unit, FFT operation on the base band signal, wherein the base band signal comprises a plurality of user data;
    extracting, using an individual user data extraction unit, user data of an individual from the plurality of user data;
    processing, using a frequency correction unit, the extracted user data of the individual to obtain a corrected frequency signal;
    receiving, using a demapper (DEMAP) into PUSCH and DMRS unit, the corrected frequency signal;
    splitting, using the DEMAP into PUSCH and DMRS unit, the corrected frequency signal into a DMRS signal and a PUSCH signal;
    transmitting, using the DEMAP into PUSCH and DMRS unit, the DMRS signal and the PUSCH signal;
    receiving, using an equalizer unit, the PUSCH signal from the DEMAP into PUSCH and DMRS unit;

performing, using the equalizer unit, channel equalization on the PUSCH signal to obtain equalized data;

receiving, using a channel estimation unit, the DMRS signal; determining, using the channel estimation unit, a channel estimation (H) in the form of a complex value for each sub carrier;

providing, using the channel estimation unit, difference in angles between the channel estimation of time slots 0 and 1;

determining, using a frequency estimation unit, an estimate of a frequency offset based on the difference of angle of channel estimates of two slots within one sub frame after appropriate scaling;

transmitting, using the frequency estimation unit, the estimated frequency; receiving, using a multiplexer unit, the estimated frequency; transmitting, using the multiplexer unit, the estimated frequency to the frequency correction unit;

receiving, using an equalized data processing and CRC calculating unit, the equalized data associated with the PUSCH signal from the equalizer unit;

processing, using the equalized data processing and CRC calculating unit, the equalized data to calculate cyclic redundancy check (CRC) value; and determining, using a CRC value unit, whether the calculated cyclic redundancy check (CRC) value is valid or invalid, wherein when the CRC is valid, the estimated frequency is same as actual frequency offset, wherein when the CRC value is 0, a number of invalid CRCs is calculated.

8. The method of claim 7, comprising calculating an alias frequency corresponding to the estimated frequency when the number of invalid CRC exceeds a threshold value using an alias calculation unit.

9. The method of claim 7, comprising transmitting the alias frequency to the multiplexer for further processing to determine whether a calculated cyclic redundancy check (CRC) value associated with the alias frequency is valid or invalid.

* * * * *